(12) United States Patent
Yabe (10) Patent No.: US 10,381,130 B2
(45) Date of Patent: Aug. 13, 2019

(54) WIRE HARNESS

(71) Applicant: Yazaki Corporation, Minato-ku, Tokyo (JP)

(72) Inventor: Kazuyoshi Yabe, Susono (JP)

(73) Assignee: Yazaki Corporation, Minato-ku, Tokyo (JP)

( * ) Notice: Subject to any disclaimer, the term of this patent is extended or adjusted under 35 U.S.C. 154(b) by 0 days.

(21) Appl. No.: 15/255,492

(22) Filed: Sep. 2, 2016

(65) Prior Publication Data
US 2016/0372231 A1    Dec. 22, 2016

Related U.S. Application Data

(63) Continuation of application No. PCT/JP2015/056430, filed on Mar. 4, 2015.

(30) Foreign Application Priority Data

Mar. 4, 2014 (JP) ................. 2014-041745

(51) Int. Cl.
*H01B 7/00* (2006.01)
*B60R 16/02* (2006.01)
*H01B 1/02* (2006.01)

(52) U.S. Cl.
CPC ....... *H01B 7/0045* (2013.01); *B60R 16/0207* (2013.01); *H01B 1/023* (2013.01); *H01B 1/026* (2013.01)

(58) Field of Classification Search
USPC ............. 174/102 R, 108, 109, 110 R, 113 R, 174/120 R, 125.1, 128.1
See application file for complete search history.

(56) References Cited

U.S. PATENT DOCUMENTS 4,349,694 A * 9/1982 Vives ................. H01B 7/14
                                                 174/128.1
4,471,161 A * 9/1984 Drummond ............. D07B 3/10
                                                 174/110 R
(Continued)

FOREIGN PATENT DOCUMENTS

CN    101939799 A    1/2011
CN    102509576 A    6/2012
(Continued)

OTHER PUBLICATIONS

Jun. 2, 2015—International Search Report—Intl App PCT/JP/2015/056430.
(Continued)

*Primary Examiner* — William H. Mayo, III
(74) *Attorney, Agent, or Firm* — Banner & Witcoff, Ltd.

(57) ABSTRACT

A wire harness includes a group of first electric wires connected to a first circuit and a group of second electric wires connected to a second circuit whose consumption current is smaller than that of the first circuit. The group of first electric wires include aluminum electric wires. The group of second electric wires include a large diameter electric wire having a conductor formed of aluminum or aluminum alloy, a small diameter electric wire having a conductor formed of copper or copper alloy and a cross-sectional area of the conductor thereof smaller than that of the large diameter electric wire, and an extra fine electric wire having a conductor formed of the copper or copper alloy and a cross-sectional area of the conductor thereof smaller than that of the small diameter electric wire.

4 Claims, 4 Drawing Sheets

(56) References Cited

U.S. PATENT DOCUMENTS

| | | | | |
|---|---|---|---|---|
| 4,628,151 A | * | 12/1986 | Cardas | H01B 7/0009 174/113 R |
| 4,689,444 A | * | 8/1987 | Burgess | H01B 5/08 174/128.1 |
| 6,311,394 B1 | * | 11/2001 | White | H01B 5/08 29/33 F |
| 2005/0121222 A1 | * | 6/2005 | Lee | H01B 11/12 174/113 R |
| 2010/0263911 A1 | | 10/2010 | Watanabe | |
| 2013/0284488 A1 | * | 10/2013 | Yabuki | H01B 7/0009 174/110 R |
| 2015/0122545 A1 | | 5/2015 | Uchida | |

FOREIGN PATENT DOCUMENTS

| | | | | |
|---|---|---|---|---|
| JP | 2009-170177 A | | 7/2009 | |
| JP | 2009-170178 A | * | 7/2009 | H01B 7/00 |
| JP | 2013-045529 A | | 3/2013 | |
| JP | WO 2014/010480 | * | 1/2014 | H01B 7/0009 |
| JP | 2013-45529 | * | 3/2014 | H01B 7/0009 |
| WO | 2014-010480 A1 | | 1/2014 | |

OTHER PUBLICATIONS

Sep. 15, 2016—(PCT) IPRP—App PCT/JP2015/056430.
Mar. 2, 2017—(CN) The First Office Action—App 201580011745.0.
Sep. 20, 2017—(CN) The Second Office Action—App 201580011745.0.
Aug. 1, 2017—(JP) Notification of Reasons for Refusal—App 2014-041745.
Sep. 25, 2018—(CN) Decision on Rejection—App 201580011745.0.
Mar. 20, 2018—(CN) The Third Office Action—App 201580011745.0.

* cited by examiner

<Embodiment of the present invention>

| Kind | Size | Number | | Kind | Size | Number | | |
|---|---|---|---|---|---|---|---|---|
| Copper (CAVUS) | 0.3 | 180 | → | Copper electric wire | 0.13 | 108 | (extra fine) | Second electric wire |
| | | | | Copper electric wire | 0.3 | 22 | (small diameter) | |
| | | | | Aluminum electric wire | 0.5 | 50 | (large diameter) | |
| | 0.5 | 96 | → | Copper electric wire | 0.5 | 29 | | First electric wire |
| | | | | Aluminum electric wire | 0.75 | 67 | | |
| | 0.85 | 15 | → | Copper electric wire | 0.85 | 4 | | |
| | | | | Aluminum electric wire | 1.25 | 11 | | |
| | 1.25 | 17 | → | Copper electric wire | 1.25 | 5 | | |
| | | | | Aluminum electric wire | 2 | 12 | | |
| Copper (AVSS) | 2f | 14 | → | Copper electric wire | 2f | 4 | | |
| | | | | Aluminum electric wire | 2.5 | 10 | | |
| Copper (AVS) | 3 | 5 | → | Copper electric wire | 3 | 1 | | |
| | | | | Aluminum electric wire | 5 | 4 | | |
| | 5 | 0 | → | Copper electric wire | 5 | 0 | | |
| | | | | Aluminum electric wire | 8 | 0 | | |
| | 8 | 3 | → | Copper electric wire | 8 | 1 | | |
| | | | | Aluminum electric wire | 12 | 2 | | |
| Copper (twisted wire) | 0.5x2 | 20 | → | Copper electric wire | 0.5x2 | 6 | | |
| | | | | Aluminum electric wire | 0.75x2 | 14 | | |
| Total of largest main part | | 350 | | Total of largest main part | | 350 | | |
| Outside diameter of largest main part | | 40.4 mm | | Outside diameter of largest main part | | 43.2 mm | | |
| Electric wire mass when L = 1 | | 2727 g | | Electric wire mass when L = 1 | | 1805 g | | |

FIG. 4

<Comparative Example>

| Kind | | Size | Number | | Kind | Size | Number | |
|---|---|---|---|---|---|---|---|---|
| Copper (CAVUS) | | 0.3 | 180 | → | Copper electric wire | 0.3 | 54 | } Second electric wire |
| | | | | → | Aluminum electric wire | 0.5 | 126 | |
| | | 0.5 | 96 | → | Copper electric wire | 0.5 | 29 | |
| | | | | → | Aluminum electric wire | 0.75 | 67 | |
| | | 0.85 | 15 | → | Copper electric wire | 0.85 | 4 | |
| | | | | → | Aluminum electric wire | 1.25 | 11 | |
| | | 1.25 | 17 | → | Copper electric wire | 1.25 | 5 | |
| | | | | → | Aluminum electric wire | 2 | 12 | |
| Copper (AVSS) | | 2f | 14 | → | Copper electric wire | 2f | 4 | |
| | | | | → | Aluminum electric wire | 2.5 | 10 | } First electric wire |
| Copper (AVS) | | 3 | 5 | → | Copper electric wire | 3 | 1 | |
| | | | | → | Aluminum electric wire | 5 | 4 | |
| | | 5 | 0 | → | Copper electric wire | 5 | 0 | |
| | | | | → | Aluminum electric wire | 8 | 0 | |
| | | 8 | 3 | → | Copper electric wire | 8 | 1 | |
| | | | | → | Aluminum electric wire | 12 | 2 | |
| Copper (twisted wire) | | 0.5x2 | 20 | → | Copper electric wire | 0.5x2 | 6 | |
| | | | | → | Aluminum electric wire | 0.75x2 | 14 | |
| Total of largest main part | | | 350 | | Total of largest main part | | 350 | |
| Outside diameter of largest main part | | | 40.4 mm | | Outside diameter of largest main part | | 44.9 mm | |
| Electric wire mass when L = 1 m | | | 2727 g | | Electric wire mass when L = 1 m | | 1909 g | |

WIRE HARNESS

CROSS REFERENCE TO RELATED APPLICATIONS

This application is a continuation of PCT application No. PCT/JP15/056430, which was filed on Mar. 4, 2015 based on Japanese Patent Application (No. P2014-041745) filed on Mar. 4, 2014, the contents of which are incorporated herein by reference.

BACKGROUND OF THE INVENTION

1. Field of the Invention

The present invention relates to a wire harness used in a vehicle.

2. Description of the Related Art

With a request for lightening a motor vehicle, also in an electric wire forming a wire harness for the motor vehicle, an aluminium electric wire (refer it to as an "aluminum electric wire", hereinafter) which uses aluminum or aluminum alloy extremely lower in its specific gravity than copper or copper alloy begins to be used for a core wire (a conductor) in place of a copper electric wire which uses the copper or the copper alloy for a usual core wire (a conductor).

However, since the aluminum electric wire is lower in its electric conductivity than a usual copper conductor (refer it to as a "copper electric wire" hereinafter) which uses the copper or the copper alloy for the conductor (the core wire), in order to replace the copper electric wire by the aluminum electric wire, the size of the electric wire needs to be raised by 1 to 2 ranks so as to allow the aluminum electric wire to meet a conductor resistance of the copper electric wire as shown in Table 1. In the Table 1, replacement examples of the 1-rank up and the 2-rank up are shown when the copper electric wire is replaced by the aluminum electric wire. Specifically, the conductor resistance for each size, an outside diameter of the electric wire and an electric wire mass per meter are shown. CAVUS, AVSS and AVS and a twisted wire respectively indicate general terms of specifications which prescribe structures and performances of the electric wires.

As described above, when the copper electric wire is replaced by the aluminum electric wire, since the size of the electric wire needs to be raised, the outside diameter of an entire part of the wire harness is increased, which causes a problem of a space for mounting the wire harness on the vehicle.

As a technique for solving the above-described problem, a wire harness described in patent literature 1 is known. In this wire harness, an electric wire for a small current or an electric wire for a signal is formed of the aluminum electric wire and an electric wire for a large current and grounding is formed of the copper electric wire. Namely, the aluminum electric wire and the copper electric wire are used properly and mixed together to reduce more the weight than that when all the electric wires are formed of the copper electric wires.

PRIOR ART LITERATURE

Patent Literature

Patent Literature 1 is JP-A-2009-170178.

SUMMARY OF THE INVENTION

However, the wire harness as disclosed in the in which the usual copper electric wires are partly replaced by the aluminum electric wires exhibits effectiveness in view of a reduction of weight, however, has a limitation in view of an achievement of a reduction of a diameter of the wire harness itself.

The present invention is devised by considering the above-described circumstances and it is an object thereof to provide a wire harness which achieves a reduction of its weight and a reduction of its diameter as the same time.

In order to achieve the above-described object, the wire harness according to the present invention is characterized by below-described (1) to (4).

(1) A wire harness including a group of first electric wires connected to a first circuit and a group of second electric wires connected to a second circuit whose consumption current is smaller than that of the first circuit, wherein the group of first electric wires include an aluminum electric wire and the group of second electric wires include a large diameter electric wire having a conductor formed of aluminum or aluminum alloy, a small diameter electric wire having a conductor formed of copper or copper alloy and a cross-sectional area of the conductor thereof smaller than that of the large diameter electric wire and an extra fine electric wire having a conductor formed of

TABLE 1

| Kind of electric wire | Example of copper electric wire | | | | | Replacement example to aluminum electric wire [one-rank up] | | | | Replacement example to aluminum electric wire [two-rank up] | | | |
|---|---|---|---|---|---|---|---|---|---|---|---|---|---|
| | Size of electric wire (mm$^2$) | Conductor resistance mΩ/m | Outside diameter φmm | Mass g/m | Replacement | Size of electric wire (mm$^2$) | Conductor resistance mΩ/m | Outside diameter φmm | Mass g/m | Size of electric wire (mm$^2$) | Conductor resistance mΩ/m | Outside diameter φmm | Mass g/m |
| CAVUS | 0.3 | 50.2 | 1.1 | 4.2 | ⇒ | 0.5 | 63.7 | 1.25 | 2.3 | 0.75 | 43.4 | 1.4 | 3.1 |
| | 0.5 | 32.7 | 1.3 | 6.1 | ⇒ | 0.75 | 43.4 | 1.4 | 3.1 | 1.0 | 32.0 | 1.6 | 4.1 |
| | 0.85 | 20.8 | 1.5 | 9.1 | ⇒ | 1.25 | 25.3 | 1.8 | 5.0 | 1.5 | 20.5 | 1.85 | 5.9 |
| | 1.25 | 14.3 | 1.8 | 13.3 | ⇒ | 2 | 16.3 | 2.5 | 9.1 | 2.5 | 12.0 | 2.8 | 11.7 |
| AVSS | 2 f | 9.50 | 2.6 | 21.8 | ⇒ | 2.5 | 12.0 | 2.8 | 11.7 | 3 | 10.6 | 3.05 | 13.6 |
| AVS | 3 | 5.59 | 3.6 | 37.8 | ⇒ | 5 | 6.76 | 4.4 | 27.4 | — | | | |
| | 5 | 3.52 | 4.4 | 58.7 | ⇒ | 8 | 4.08 | 5.55 | 42.2 | 10 | 3.18 | 6.45 | 55.7 |
| | 8 | 2.32 | 5.3 | 95.0 | ⇒ | 12 | 2.60 | 7 | 67.1 | 16 | 1.91 | 7.85 | 83.4 |
| Twisted wire | 0.5 × 2 | 32.7 | 2.6 | 12.2 | ⇒ | 0.75 × 2 | 43.4 | 2.8 | 6.2 | 1.0 × 2 | 32.0 | 3.2 | 8.2 | the copper or copper alloy and a cross-sectional area of the conductor thereof smaller than that of the small diameter electric wire.

(2) In a wire harness having the structure of the above-described (1), the second circuit is a signal circuit.

(3) A wire harness formed by collecting and bundling a plurality of electric wires including an aluminum electric wire, wherein a group of the electric wires of the plurality of electric wires have cross-sectional areas of conductors of 0.3 mm$^2$ or lower when the conductors are formed of copper or copper alloy and are connected to a circuit whose consumption current is small, the group of the electric wires include a large diameter electric wire having a conductor formed of aluminum or aluminum alloy and a cross-sectional area of the conductor thereof larger than 0.3 mm$^2$, a small diameter electric wire having a conductor formed of copper or copper alloy and a cross-sectional area of the conductor of 0.3 mm$^2$, and an extra fine electric wire having a conductor formed of the copper or copper alloy and a cross-sectional area of the conductor thereof smaller than 0.3 mm$^2$.

(4) A wire harness formed by collecting and bundling a plurality of electric wires including an aluminum electric wire, wherein a group of the electric wires of the plurality of electric wires have cross-sectional areas of conductors of 0.35 mm$^2$ or lower when the conductors are formed of copper or copper alloy and are connected to a circuit whose consumption current is small, the group of the electric wires include a large diameter electric wire having a conductor formed of aluminum or aluminum alloy and a cross-sectional area of the conductor thereof larger than 0.35 mm$^2$, a small diameter electric wire having a conductor formed of copper or copper alloy and a cross-sectional area of the conductor of 0.35 mm$^2$, and an extra fine electric wire having a conductor formed of the copper or copper alloy and a cross-sectional area of the conductor thereof smaller than 0.35 mm$^2$.

According to the wire harness having the structures of the above-described (1) and (2), the group of the second electric wires connected to the second circuit (for instance, the signal circuit) whose consumption current is small include the large diameter electric wire formed of the aluminum electric wire, the small diameter electric wires formed of the copper electric wires and the extra fine electric wires formed of the copper electric wires, and the extra fine electric wires with the copper electric wires which have the cross-sectional areas of the conductors smaller than those of the small diameter electric wires are used. Accordingly, a diameter of an electric wire bundle (a diameter of the entire wire harness) including the first electric wires and the second electric wires can be reduced. Further, since the group of the first electric wires connected to the first circuit whose consumption current is large include the aluminum electric wires, the entire part of the wire harness can be lightened.

According to the wire harness having the structure of the above-described (3), since the electric wires which have the cross-sectional areas of the conductors of 0.3 mm$^2$ or lower when the conductors are formed of the copper or the copper alloy and are connected to the circuit whose consumption current is small are classified into three kinds of the large diameter electric wires, the small diameter electric wires and the extra fine electric wires, and the large diameter electric wires are formed of the aluminum electric wires and the small diameter electric wires and the extra fine electric wires are formed of the copper electric wires, the weight and the diameter of the entire part of the wire harness can be decreased.

According to the wire harness having the structure of the above-described (4), since the electric wires which have the cross-sectional areas of the conductors of 0.35 mm$^2$ or lower when the conductors are formed of the copper or the copper alloy and are connected to the circuit whose consumption current is small are classified into three kinds of the large diameter electric wires, the small diameter electric wires and the extra fine electric wires, and the large diameter electric wires are formed of the aluminum electric wires and the small diameter electric wires and the extra fine electric wires are formed of the copper electric wires, the weight and the diameter of the entire part of the wire harness can be decreased. In a standard (JASO, D611) of the copper electric wire, a copper electric wire called "0.3" and a copper electric wire called "0.35" exist. Both the copper electric wires have almost the same size. The wire harness of the present invention can be applied not only to the copper electric wire called "0.3", but also to the copper electric wire called "0.35".

According to the present invention, the wire harness can be lightened and the diameter of the entire part of the wire harness can be reduced at the same time.

The present invention is briefly described above. Further, when a mode for carrying out the invention (refer it to as an "embodiment", hereinafter) which will be described below is read by referring to the attached drawings, a detail of the present invention will be more clarified.

DETAILED DESCRIPTION OF THE EXEMPLARY EMBODIMENTS

Now, the embodiment of the wire harness according to the present invention will be described below by referring to the drawings.

The drawings are schematically shown and ratios of dimensions are respectively different from those of actual dimensions.

The wire harness of the present embodiment is arranged in a vehicle such as a motor vehicle and used as, for instance, an instrument panel harness, a floor harness, an engine room harness, a roof harness, a door harness or the like.

Figure 1A:
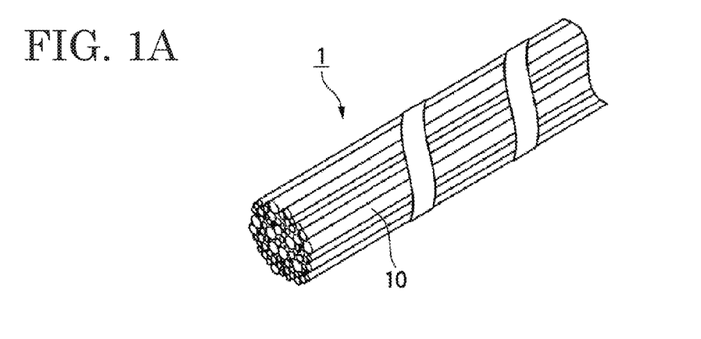
FIG. 1A is a perspective view of a wire harness of an embodiment of the present invention.
Figure 1B:
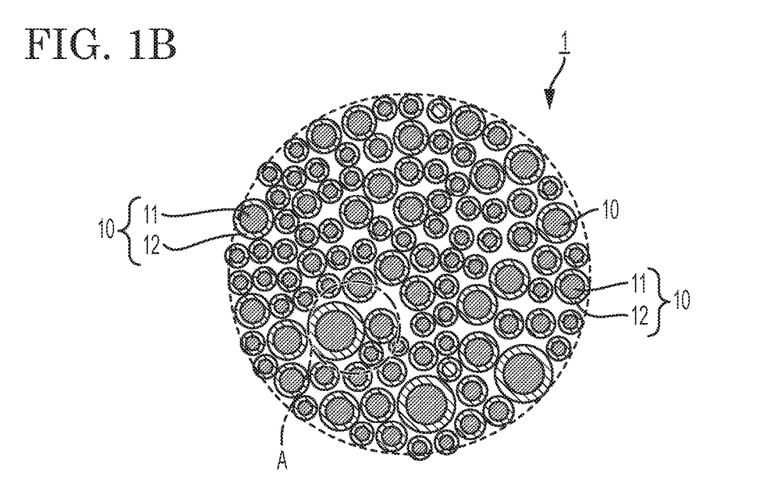
FIG. 1B is a sectional view of the wire harness.
Figure 1C:
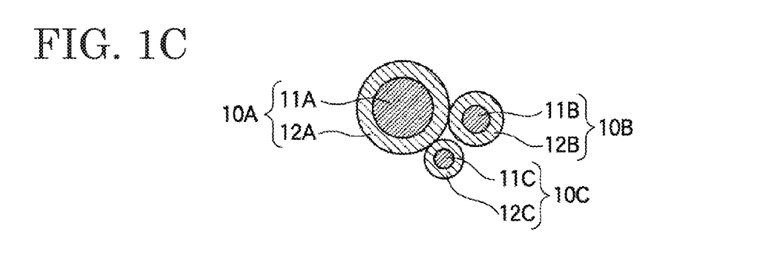
FIG. 1C is an enlarged view of A in FIG. 1B.

As shown in FIG. 1A and FIG. 1B, the wire harness 1 of the present embodiment is formed by collecting and bundling a plurality of electric wires 10 which have conductors (core wires) 11 respectively different in cross-sectional areas of the conductors (sizes) covered with insulating sheath members 12. As shown in FIG. 10, groups of the electric wires 10 forming the wire harness are roughly classified into and include electric wires 10A for a large electric current and grounding connected to a large electric current power circuit or a grounding circuit to supply a large electric current, electric wires 10B for a small electric current to supply a consumption current smaller than that of the large electric current and electric wires 100 for signals for a signal circuit to supply a consumption current smaller than that of the electric wires 10B for the small electric current.

As shown in FIG. 10, the electric wire 10A for the large electric current and grounding is formed of an electric wire having a conductor 11A covered with a sheath member 12A. The electric wire 10B for the small electric current is an electric wire having a conductor 11B covered with a sheath member 12B. The electric wire 100 for the signal is an electric wire having a conductor 110 covered with a sheath member 12C. Here, the electric wire 10A for the large electric current and grounding and the electric wire 10B for the small electric current are referred to as first electric wires connected to a first circuit and the electric wire 100 for the signal is referred to as a second electric wire connected to a second circuit whose consumption current is smaller than that of the first circuit.

In the wire harness of the present embodiment, not only in a group of the first electric wires, but also in a group of the second electric wires, copper electric wires and aluminum electric wires are mixed and used together (a detail will be described below.) Here, when the electric wire 100 for the signal as the second electric wire indicates an electric wire in which a cross-sectional area of the conductor is 0.3 mm$^2$ (or 0.35 mm$^2$) or smaller when the conductor is formed of copper or copper alloy. As compared therewith, the groups of the first electric wires are formed of the electric wires having sizes of 0.3 mm$^2$ (or 0.35 mm$^2$) or larger.

In the groups of the second electric wires for the signal circuit, three kinds of electric wires (a large diameter electric wire, a small diameter electric wire, an extra fine electric wire) mentioned in below-described (1) to (3) are included.
(1) The large diameter electric wire in which a cross-sectional area of the conductor formed of aluminum or aluminum alloy is larger than 0.3 mm$^2$ (or 0.35 mm$^2$).
(2) The small diameter electric wire in which a cross-sectional area of the conductor formed of the copper or the copper alloy is 0.3 mm$^2$ (or 0.35 mm$^2$) smaller than that of the large diameter electric wire.
(3) The extra fine electric wire in which a cross-sectional area of the conductor formed of the copper or the copper alloy is smaller than 0.3 mm$^2$ (or 0.35 mm$^2$) smaller than that of the small diameter electric wire.

Now, a structure example of the instrument panel harness of an ordinary medium type motor vehicle will be described below.

In a wire harness of the ordinary medium type motor vehicle, the number of circuits (the number of electric wires) is about 400. The number of the electric wires of the largest main part of the harness in total is 350 in the present embodiment. Sizes and distribution of the number of electric wires in a usual example that all the electric wires are formed of copper electric wires are shown in left columns of the tables in FIG. 3. Further, sizes and distribution of the number of the electric wires of the wire harness of the present embodiment that the electric wires are partly replaced by the aluminum electric wires are shown in right columns of the tables in FIG. 3. Arrow marks drawn between the left columns and the right columns show methods for distributing the number of the electric wires when the electric wires shown in the left column are replaced by the electric wires shown in the right column. In lower parts of the columns respectively, are shown outside diameters of the largest main parts and electric wire masses per meter.

Figure 3:
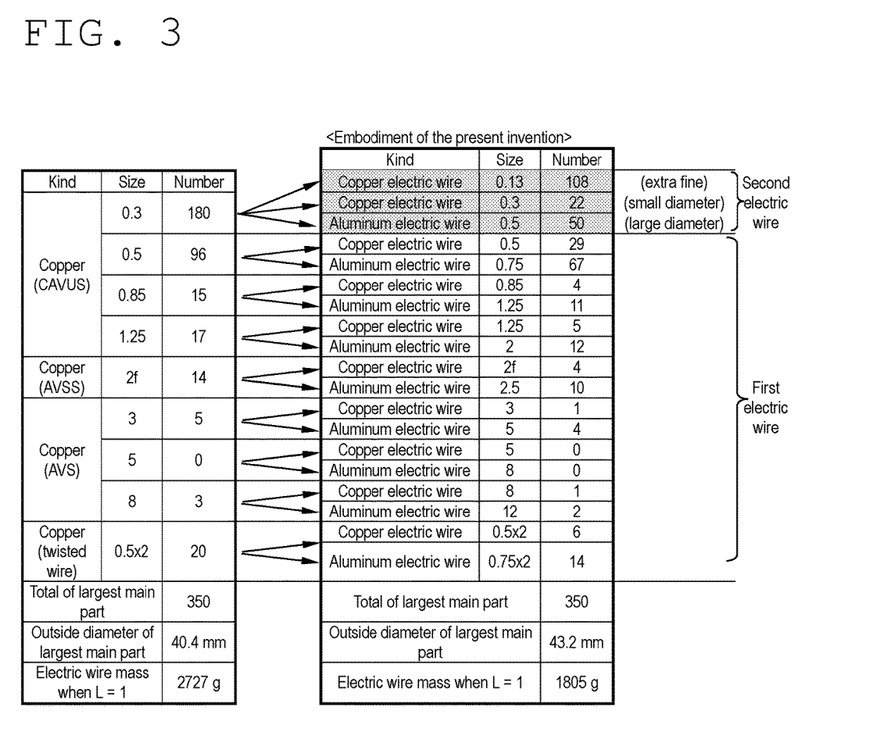
FIG. 3 illustrates tables showing example sizes and distribution of electric wires of varying materials according to an aspect of the disclosure.

As shown in FIG. 3, in the wire harness of the present embodiment, the electric wire in which the cross-sectional area of the conductor is 0.3 mm$^2$ (or 0.35 mm$^2$) or smaller, namely, the copper electric wire of the size of 0.3 (or 0.35) when the conductor is formed of the copper or the copper alloy (the left column) is formed so as to be distributed to the three kinds of electric wires as shown in the right column. Namely, the copper electric wire is distributed to the aluminum electric wire of the size of 0.5 (the large diameter electric wire), the copper electric wire of the size of 0.3 (or 0.35) (the small diameter electric wire) and the copper electric wire of the size of 0.13 (the extra fine electric wire). Especially, 60 percent (108 electric wires) as many as the 180 copper electric wires having the size of 0.3 in the usual example are replaced by the extra fine copper electric wires of the size of 0.13. The copper electric wires of the size of 0.3 (or 0.35) in the usual wire harness include a large number of circuits whose consumption current is small. Half or more as many as the copper electric wires of the size of 0.3 (or 0.35) can be replaced by the extra fine electric wires. In the present embodiment, about 60 percent of the copper electric wires are replaced by the extra fine electric wires.

Further, the copper electric wire having the size larger than the size of 0.3 (or 0.35) (the size of 0.5 or larger) is formed so as to be distributed to the aluminum electric wire and the copper electric wire. In an entire part of the wire harness, about 70 percent (170 electric wires) of the electric wires (242 electric wires) which exclude the extra fine electric wires (108 electric wires) are formed as the aluminum electric wires and remaining 30 percent (72 electric wires) are formed as the copper electric wires. All the copper electric wires may be replaced by the aluminum electric wires. However, a case is supposed that all the copper electric wires are hardly replaced by the aluminum electric wires depending on conditions of a terminal to be connected. Thus, in the present embodiment, about 70 percent of the electric wires are replaced by the aluminum electric wires.

Figure 4:
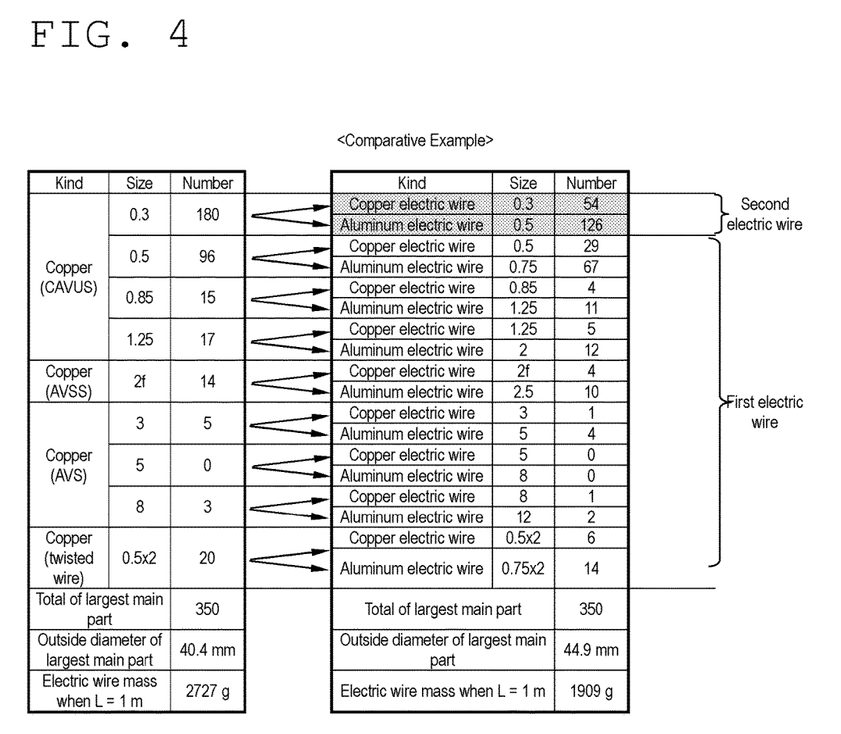
FIG. 4 illustrates tables showing a comparative example wire harness according to an aspect of the disclosure.

In the meantime, a comparative example is shown in FIG. 4.

In the wire harness of the comparative example, the electric wire in which the cross-sectional area of the conductor is 0.3 mm$^2$ (or 0.35 mm$^2$) or smaller, namely, the copper electric wire of the size of 0.3 (or 0.35) when the conductor is formed of the copper or the copper alloy (the left column) is formed so as to be distributed to the two kinds of electric wires as shown in the right column. Namely, the copper electric wire of the size 0.3 (or 0.35) is distributed to the aluminum electric wire of the size of 0.5 (the large diameter electric wire) and the copper electric wire of the size of 0.3 (or 0.35) (the small diameter electric wire). The copper electric wire having the size larger than the size 0.3 (or 0.35) (the size of 0.5 or larger) is formed so as to be distributed in the same manner as shown in FIG. 3. In the wire harness of the comparative example, for about 70 percent (246 electric wires) as many as all the electric wires (350 electric wires), the copper electric wires are replaced by the aluminum electric wires.

As understood by comparing mesh parts respectively in the right columns of the tables in FIGS. 3 and 4, in the comparative example of FIG. 4, the copper electric wire of the size of 0.3 (or 0.35) in the usual wire harness is distributed to the two kinds of the aluminum electric wire of the size of 0.5 (the large diameter electric wire) and the copper electric wire of the size of 0.3 (or 0.35) (the small diameter electric wire). As compared therewith, in the present embodiment of FIG. 3, the copper electric wire of the size of 0.3 (or 0.35) is distributed to the three kinds of the aluminum electric wire of the size of 0.5 (the large diameter electric wire), the copper electric wire of the size of 0.3 (or 0.35) (the small diameter electric wire) and the copper electric wire of the size of 0.13 (the extra fine electric wire).

Figure 2A:
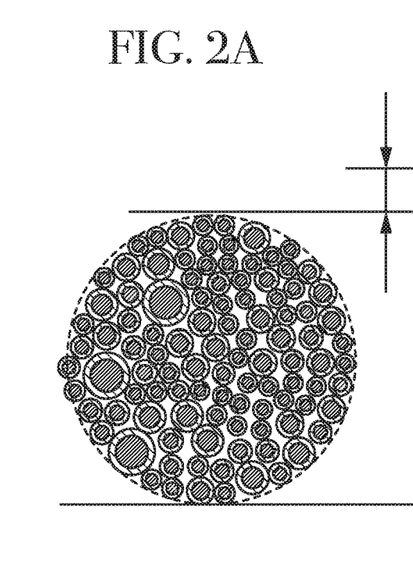
FIG. 2A is a sectional view of a usual wire harness in which all electric wires are formed of copper electric wires.
Figure 2B:
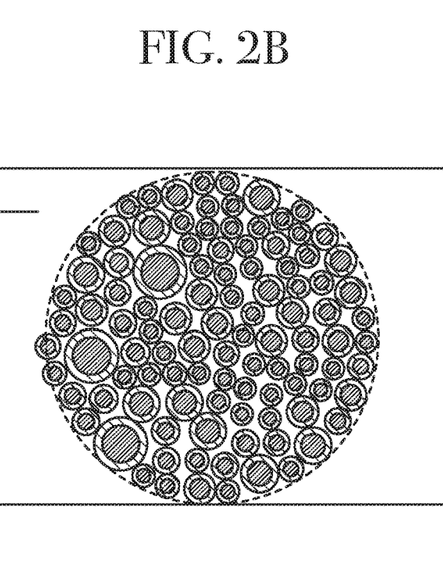
FIG. 2B is a sectional view of a wire harness of a comparative example in which 70 percent of electric wires is replaced by aluminum electric wires.
Figure 2C:
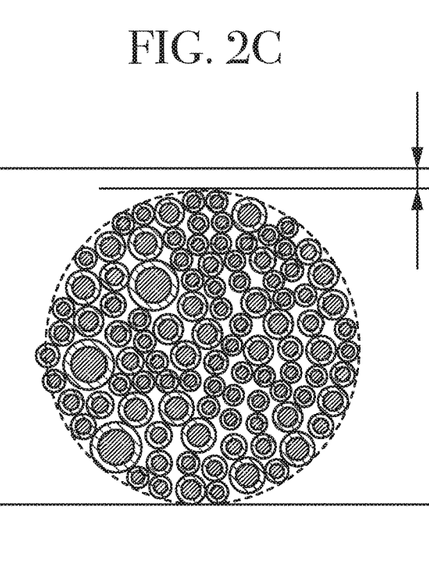
FIG. 2C is a sectional view of the wire harness of the embodiment of the present invention.

In such a structure, as shown in FIG. 2C, the outside diameter of the entire part of the wire harness can be restrained from being enlarged. Namely, in the comparative example shown in FIG. 2B, the wire harness is liable to be more enlarged than a wire harness of the usual example (the wire harness in which all the electric wires are formed of the copper electric wires) shown in FIG. 2A. However, in the present embodiment shown in FIG. 2C, an enlargement can be more suppressed than the comparative example shown in FIG. 2B. Further, as can be understood by viewing the lower columns of the tables of FIGS. 3 and 4, the electric wire mass can be also more reduced than that of the usual example.

The above-described extra fine electric wire indicates an electric wire lower than CAVUS ($0.3=^2$ (or CHFUSO $0.35$ mm$^2$), namely, a size of 0.22 mm$^2$ or a size of 0.13 mm$^2$) prescribed in JASO D 611 (a component of a motor vehicle: a low voltage electric wire). The extra fine electric wire has an outside diameter smaller than 1.1 mm, an allowable electric current of several mA to 5 A and a mass: lower than about 4.2 g/m. One example of conductor resistances, outside diameters and masses of sizes respectively is shown in Table 2.

TABLE 2

Example of extra fine (copper) electric wire

| Size of electric wire (mm$^2$) | Conductor resistance mΩ/m | Outside diameter φmm | Mass g/m |
|---|---|---|---|
| 0.22 | 84.4 | 0.95 | 2.2 |
| 0.13 | 180 | 0.85 | 1.9 |

As described above, when the extra fine electric wire is used, the outside diameter of the entire part of the wire harness can be restrained from being enlarged and the weight of the wire harness can be reduced at the same time.

The present invention is not limited to the above-described embodiment and may be suitably modified and improved. In addition thereto, as long as the present invention can be achieved, materials, forms dimensions, numbers and arranged positions of component elements respectively in the above-described embodiment are not limited.

Here, features of the above-described embodiment of the wire harness according to the present invention are respectively briefly summarized and listed in below-described (1) to (4).

(1) A wire harness (1) including a group of first electric wires (electric wires 10A for a large electric current and grounding, electric wires 10B for a small electric current) connected to a first circuit and a group of second electric wires (electric wires 100 for signals) connected to a second circuit whose consumption current is smaller than that of the first circuit, wherein the group of first electric wires include aluminum electric wires and the group of second electric wires include large diameter electric wires having conductors formed of aluminum or aluminum alloy, small diameter electric wires having conductors formed of copper or copper alloy and cross-sectional areas of the conductors smaller than those of the large diameter electric wires and extra fine electric wires having conductors formed of the copper or copper alloy and cross-sectional areas of the conductors smaller than those of the small diameter electric wires.

(2) A wire harness having the structure of the above-described (1), wherein the second circuit is a signal circuit.

(3) A wire harness (1) formed by collecting and bundling a plurality of electric wires including aluminum electric wires, wherein a group of the electric wires of the plurality of electric wires which have cross-sectional areas of conductors of 0.3 mm$^2$ or lower when the conductors are formed of copper or copper alloy and are connected to a circuit whose consumption current is small include large diameter electric wires having conductors formed of aluminum or aluminum alloy and cross-sectional areas of the conductors larger than 0.3 mm$^2$, small diameter electric wires having conductors formed of copper or copper alloy and cross-sectional areas of the conductors of 0.3 mm$^2$ and extra fine electric wires having conductors formed of the copper or copper alloy and cross-sectional areas of the conductors smaller than 0.3 mm$^2$.

(4) A wire harness (1) formed by collecting and bundling a plurality of electric wires including aluminum electric wires, wherein a group of the electric wires of the plurality of electric wires which have cross-sectional areas of conductors of 0.35 mm$^2$ or lower when the conductors are formed of copper or copper alloy and are connected to the circuit whose consumption current is small include large diameter electric wires having conductors formed of aluminum or aluminum alloy and cross-sectional areas of the conductors larger than 0.35 mm$^2$, small diameter electric wires having conductors formed of copper or copper alloy and cross-sectional areas of the conductors of 0.35 mm$^2$ and extra fine electric wires having conductors formed of the copper or copper alloy and cross-sectional areas of the conductors smaller than 0.35 mm$^2$.

The present invention is described in detail by referring to the specific embodiment. However, it is to be understood to a person with ordinary skill in the art that various changes or modifications may b e added without departing from the spirit and scope of the present invention.

According to the present invention, a reduction of weight and a reduction of a diameter can be achieved effectively at the same time. The present invention having the above-described effects is available for the wire harness used in the vehicle.

What is claimed is:

1. A wire harness comprising:
    a group of first electric wires connected to a first circuit; and
    a group of second electric wires connected to a second circuit whose consumption current is smaller than that of the first circuit, wherein:
        the group of first electric wires include copper electric wires and aluminum electric wires, and
        the group of second electric wires include a large diameter electric wire having a conductor formed of aluminum or aluminum alloy, a small diameter electric wire having a conductor formed of copper or copper alloy and a cross-sectional area of the conductor thereof smaller than that of the large diameter electric wire, and an extra fine electric wire having a conductor formed of copper or the copper alloy and a cross-sectional area of the conductor thereof smaller than that of the small diameter electric wire,
        wherein, in the group of the second electric wires:

the large diameter electric wire has a conductor formed of aluminum or aluminum alloy and a cross-sectional area of the conductor thereof is larger than 0.3 mm$^2$, the small diameter electric wire has a conductor formed of copper or copper alloy and a cross-sectional area of the conductor thereof is 0.3 mm$^2$, and the extra fine electric wire has a conductor formed of the copper or copper alloy and a cross-sectional area of the conductor thereof is smaller than 0.3 mm$^2$.

2. The wire harness according to claim 1, wherein the second circuit is a signal circuit.

3. The wire harness according to claim 1, wherein, in the group of the second electric wires, the large diameter electric wire has a conductor formed of aluminum or aluminum alloy and a cross-sectional area of the conductor thereof is larger than 0.35 mm$^2$.

4. The wire harness according to claim 1, wherein the group of second electric wires is connected to a circuit, and wherein a consumption current of the circuit is smaller than that of another circuit to which an electric wire, other than the group of second electric wires, connects.

\* \* \* \* \*